(12) United States Patent
Tang

(10) Patent No.: US 11,628,109 B2
(45) Date of Patent: Apr. 18, 2023

(54) BED ASSEMBLY

(71) Applicant: Gold Nanotech, Inc., Taipei (TW)

(72) Inventor: James Tang, Taipei (TW)

(73) Assignee: Gold Nanotech, Inc., Taipei (TW)

( * ) Notice: Subject to any disclaimer, the term of this patent is extended or adjusted under 35 U.S.C. 154(b) by 612 days.

(21) Appl. No.: 16/809,407

(22) Filed: Mar. 4, 2020

(65) Prior Publication Data

US 2021/0275373 A1 Sep. 9, 2021

(51) Int. Cl.
*A61G 7/018* (2006.01)
*F16H 7/06* (2006.01)
*A61G 7/02* (2006.01)
*F16H 19/06* (2006.01)
*F16H 25/20* (2006.01)

(52) U.S. Cl.
CPC .............. *A61G 7/018* (2013.01); *A61G 7/02* (2013.01); *F16H 7/06* (2013.01); *F16H 19/06* (2013.01); *F16H 25/20* (2013.01); *F16H 2019/0686* (2013.01); *F16H 2025/2084* (2013.01); *F16H 2025/2093* (2013.01)

(58) Field of Classification Search
CPC ...... A61G 7/018; A61G 7/02; A61G 7/05769; A61G 7/0005; A61G 7/1003; F16H 7/06; F16H 19/06; F16H 25/20; F16H 2019/0686; F16H 2025/2084; F16H 2025/2093; A47C 27/10
USPC .................................................... 5/604, 88.1
See application file for complete search history.

(56) References Cited

U.S. PATENT DOCUMENTS

| | | | | |
|---|---|---|---|---|
| 3,093,836 A | * | 6/1963 | Christensen | A61G 7/0005 5/606 |
| 3,886,605 A | * | 6/1975 | Harris | A61G 7/1046 5/88.1 |
| 3,959,832 A | * | 6/1976 | Parsons | A61G 7/05723 5/84.1 |
| 4,068,326 A | * | 1/1978 | Deschler | A61G 7/0005 4/569 |
| 4,821,348 A | * | 4/1989 | Pauna | A61G 7/0005 5/604 |
| 5,054,136 A | * | 10/1991 | Inagaki | A61G 7/0005 5/81.1 R |
| 5,247,712 A | * | 9/1993 | Williams | A47K 3/06 4/584 |
| 5,544,371 A | * | 8/1996 | Fuller | A61G 7/1015 5/85.1 |
| 5,704,083 A | * | 1/1998 | Nerg | A61G 7/012 5/934 |
| 6,049,923 A | * | 4/2000 | Ochiai | A61G 7/1055 5/85.1 |
| 8,156,582 B2 | * | 4/2012 | Rupar | A61G 7/1032 5/81.1 R |
| 10,245,197 B2 | * | 4/2019 | Sheth | A61H 9/0021 |

(Continued)

*Primary Examiner* — Myles A Throop

(57) ABSTRACT

A bed assembly includes a bed having a head end, a foot end and a frame which is connected between the head end and the foot end. A water-proof pad is located between the head end and the foot end. The water-proof pad can be tightened, loosened and movable up and down. A bed board unit is pivotably connected to two sides of the frame so that the bed board unit is opened and closed when needed. An inflatable tub or bedpan is located beneath the bed so that when the bed board unit is opened, the patient can use the inflatable tub or the bedpan and does not have to be removed from the bed.

8 Claims, 8 Drawing Sheets

(56) References Cited

U.S. PATENT DOCUMENTS

| | | | |
|---|---|---|---|
| 10,398,612 B2* | 9/2019 | Iida .................. | A61G 7/0005 |
| 2002/0023297 A1* | 2/2002 | Khait ................ | A61G 7/0005 |
| | | | 5/600 |
| 2018/0369041 A1* | 12/2018 | Sheth ................ | A61B 5/6892 |
| 2020/0054176 A1* | 2/2020 | Malassigne ........ | A47K 3/125 |

* cited by examiner

BED ASSEMBLY

BACKGROUND OF THE INVENTION

1. Fields of the Invention

The present invention relates to a bed assembly, and more particularly, to a multiple-function bed assembly with movable parts to avoid patients from decubitus, and to allow the assistants to easily take care of the patients.

2. Descriptions of Related Art

For some patients who cannot take care themselves require assistants to help them to turn, clean and use bed pans. However, it takes risks to move the patients because the patients may fall down or hit by solid objects around them.

Although there are services available to provide shower service to the patients, these services sometime cannot make the patients feel comfortable.

The present invention is intended to provide a bed assembly that allows the assistants or families of the patients to easily take multiple activities to take care the patients, such as cleaning the patients, removing the patients from the bed to avoid from decubitus and helping the patients to release bowel movement or urinate while they are in bed.

SUMMARY OF THE INVENTION

The present invention provides a bed assembly that includes a water-proof pad and pivotable bed board unit to help the assistants or families of the patient to conveniently take care the patient in bed.

The present invention relates to a bed assembly and comprises a bed having a head end, a foot end and a frame which is connected between the head end and the foot end. A water-proof pad is located between the head end and the foot end, wherein the water-proof pad is able to be tightened, loosened and movable up and down. A bed board unit is pivotably connected to two sides of the frame so as to be opened and closed. An inflatable tub is located beneath the bed which is inflated to form a tub with a cushion button enclosed by a sidewall.

Preferably, the frame includes multiple transverse bars evenly connected between the two sides thereof.

Preferably, an operational panel is connected to the foot end and controls a transmission device in the foot end.

Preferably, the transmission device includes a top link, a bottom link and a gear reduction motor. The water-proof pad is wrapped to the top link. The top link includes a top gear connected to each of two ends thereof. The bottom link includes a bottom gear connected to each of two ends thereof. A chain is connected to the top gear and the bottom gear of each of the two ends of the top link and the bottom link. Each of the top gears includes an electro-magnetic valve key. A passive gear is co-axially connected to the bottom link. The bottom link includes a threaded section and a slide. The slide has a rack which is threadedly engage with the threaded section so that the slide is movable along the threaded section. The slide has a pin extending therefrom to restrict rotation of the bottom gear. The gear reduction motor directly drives a first bevel gear. The first bevel gear is engaged with the passive gear to control rotation of the bottom link which then rotates the top link via the chains.

Preferably, the transmission device includes a second bevel gear indirectly driven by the gear reduction gear, a first pulley unit and a second pulley unit. The first pulley unit includes a first gear, a first pulley co-axially connected to the first gear, a first inside pulley, a first outside pulley and a first stationary pulley. The second pulley unit includes a second gear, a second pulley co-axially connected to the second gear, a second inside pulley, a second outside pulley and a second stationary pulley. A first cable has the first end thereof movably connected to at least one transverse bar connected between the two sides of the frame. The second end of the first cable goes around the first stationary pulley and passes through the at least one transverse bar, and the second end of the first cable goes around the first outside pulley, the first pulley, the first inside pulley and is fixed to the at last one transverse bar. A second cable has the first end thereof movably connected to the at least one transverse bar connected between the two sides of the frame. The second end of the second cable goes around the second stationary pulley and passes through the at least one transverse bar, and the second end of the second cable goes around the second outside pulley, the second pulley, the second inside pulley and is fixed to the at last one transverse bar.

Preferably, the transmission device includes a first transmission unit, a second transmission unit and a driven gear. The first transmission unit includes a first co-axial gear, a first end gear and a first chain. The second transmission unit includes a second co-axial gear, a second end gear and a second chain. The driven gear is co-axially connected to the second co-axial gear which is engaged with the first co-axial gear. The first and second end gears are respectively connected to the two sides of the frame.

Preferably, the bed assembly includes an air source which is a pressurized air bottle or an air compressor.

Preferably, the inflatable tub can be replaced with a bedpan.

Preferably, the bed unit is pivotably connected to one of the two sides of the frame.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
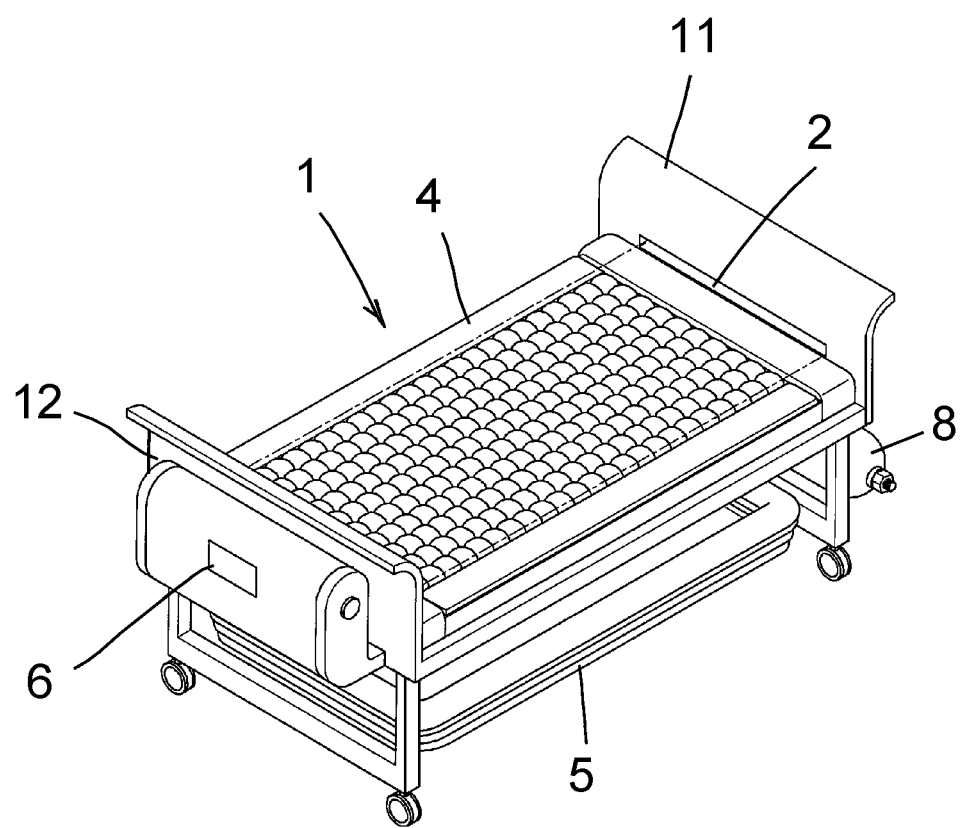
FIG. 1 is a perspective view to show the bed assembly of the present invention.
Figure 2:
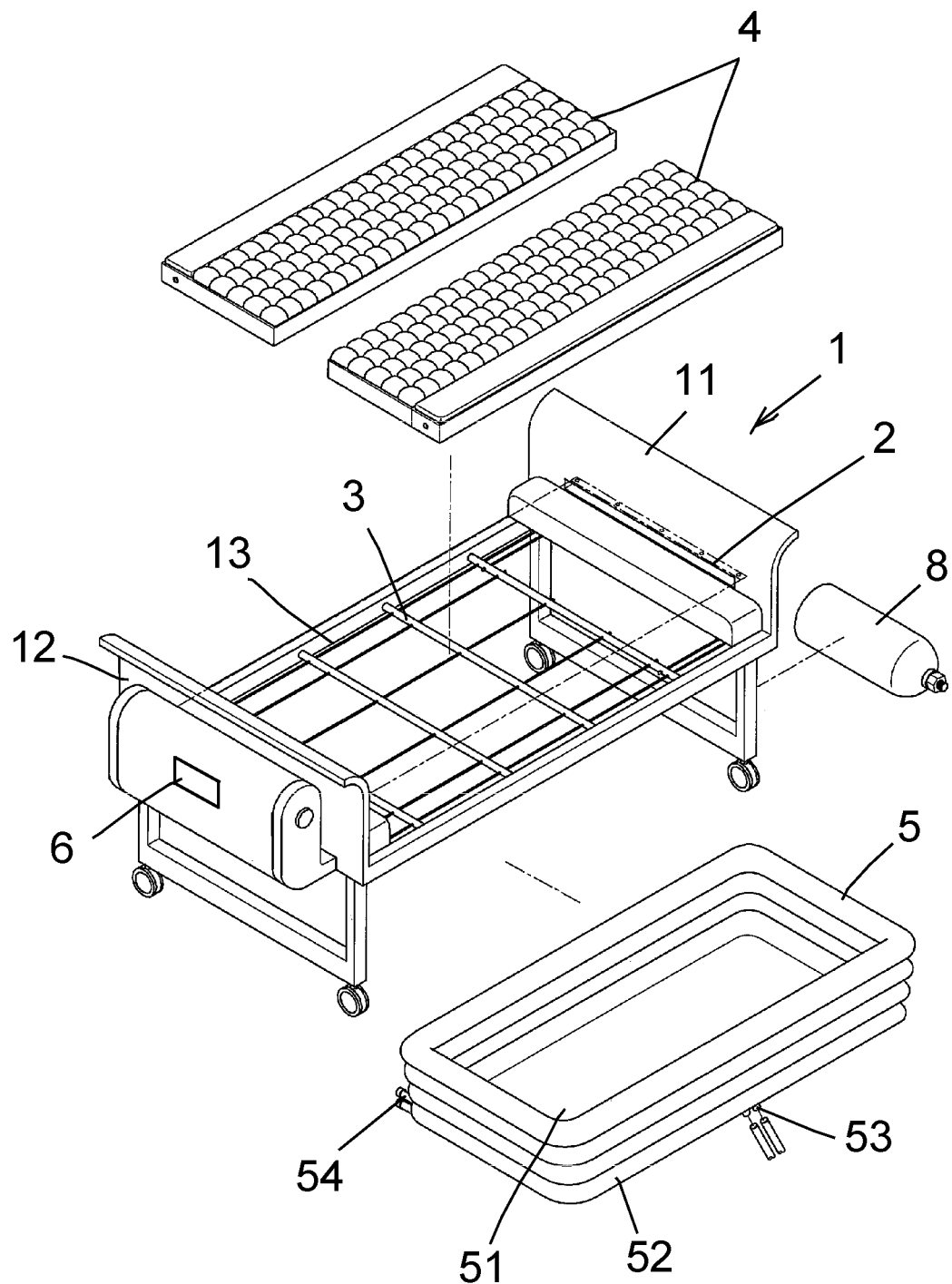
FIG. 2 is an exploded view of the bed assembly of the present invention.

Referring to FIGS. 1 and 2, the bed assembly of the present invention comprises a bed 1 having a head end 11, a foot end 12 and a frame 13 which is connected between the head end 11 and the foot end 12. A water-proof pad 2 is located between the head end 11 and the foot end 12. The water-proof pad 2 performs like a conveyor and can be tightened, loosened and movable up and down. The frame 13 includes multiple transverse bars 3 evenly connected between the two sides thereof, in this embodiment, there are four transverse bars 3 so as to evenly support the weight of the patient in the bed 1. A bed board unit 4 is pivotably connected to two sides of the frame 13 so as to be closed and opened. Multiple inflatable balls are located on the bed board unit 4. An inflatable tub 5 is located beneath the bed 1. The inflatable tub 5 can be inflated to form a tub with a cushion button 51 which is enclosed by a sidewall 52, such that the patient can be cleaned up in the inflatable tub 5 and does not have to be removed from the bed 1.

An operational panel 6 is connected to the foot end 12 and controls a transmission device 7 in the foot end 12. The operational panel 6 is operated to control the operation of the water-proof pad 2, the pivotal movement of the bed board unit 4 and the supply or release of the air or water for the inflatable tub 5.

Figure 3:
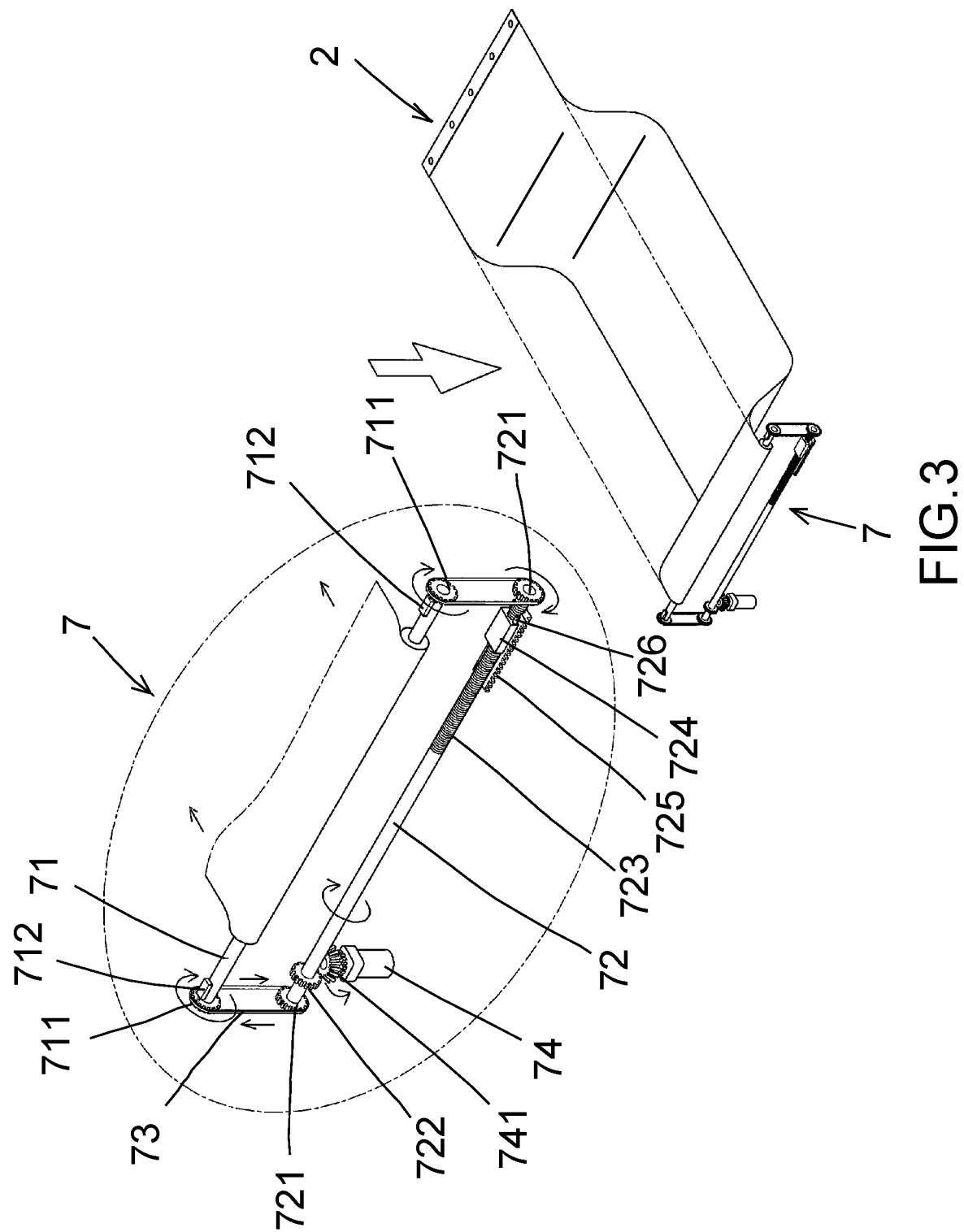
FIG. 3 shows the operation of the water-proof pad of the bed assembly of the present invention.

As shown in FIG. 3, for the operation of the water-proof pad 2, the transmission device 7 includes a top link 71, a bottom link 72 and a gear reduction motor 74. The water-proof pad 2 is wrapped to the top link 71. The top link 71 includes a top gear 711 connected to each of two ends thereof. The bottom link 72 includes a bottom gear 721 connected to each of two ends thereof. A chain 73 is connected to the top gear 711 and the bottom gear 721 of each of the two ends of the top link 71 and the bottom link 72. Each of the top gears 711 includes an electro-magnetic valve key 712 so that the top gears 711 are controlled to be freely rotatable relative to the top link 71 or to be co-rotatable with the top link 71. A passive gear 722 is co-axially connected to the bottom link 72. The bottom link 72 further includes a threaded section 723 and a slide 724. The slide 724 has a rack 725 which is threadedly engage with the threaded section 723 so that the slide 724 is movable along the threaded section 723. The slide 724 has a pin 726 extending therefrom to restrict rotation of the bottom gear 721. The gear reduction motor 74 directly drives a first bevel gear 741. The first bevel gear 741 is engaged with the passive gear 722 to control rotation of the bottom link 72 which then rotates the top link 71 via the chains 73.

When the water-proof pad 2 is to be tightened, the gear reduction motor 74 drives the water-proof pad 2 to be scrolled clockwise. The first bevel gear 741 drives the passive gear 722 and the chain 73 so that the top link 71 is rotated to tighten the water-proof pad 2. The pin 726 is then inserted into the bottom gear 721. The electro-magnetic valve key 712 on the top gear 711 is activated to secure the top link 71 so that the top gear 711 is freely rotated.

On the contrary, when the water-proof pad 2 is to be loosened, the above mentioned steps are reversely operated. That is to say, the electro-magnetic valve key 712 on the top gear 711 is removed from the top link 71 so that the top gear 711 is co-rotated with the top link 71. The gear reduction motor 74 drives the water-proof pad 2 to be expanded counter clockwise, the bottom link 72 is simultaneously rotated and drives the pin 726 to be separated from the bottom gear 721. Therefore, the water-proof pad 2 is loosened and lowered.

Figure 4:
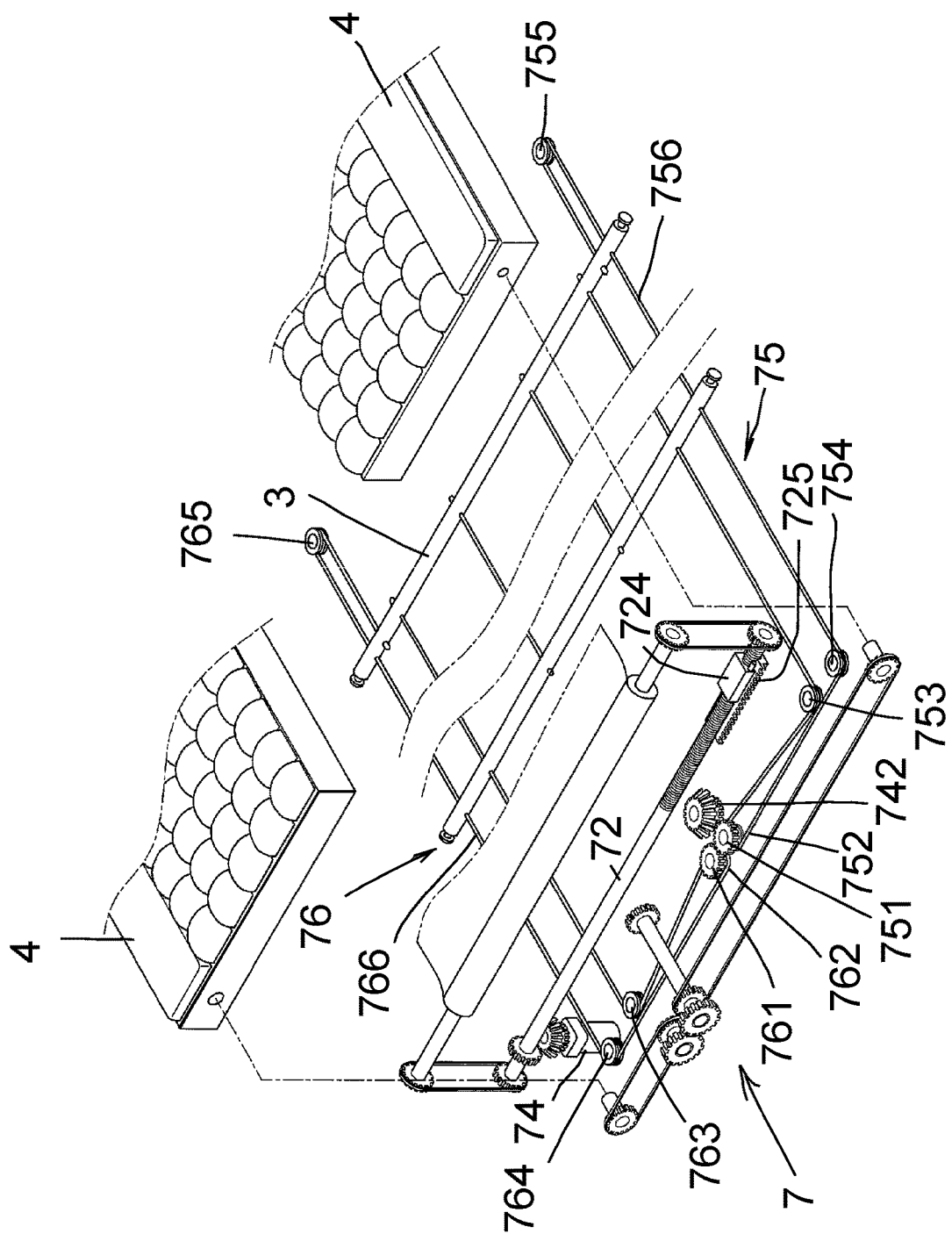
FIG. 4 shows the bed board unit and the frame of the bed assembly of the present invention.
Figure 5:
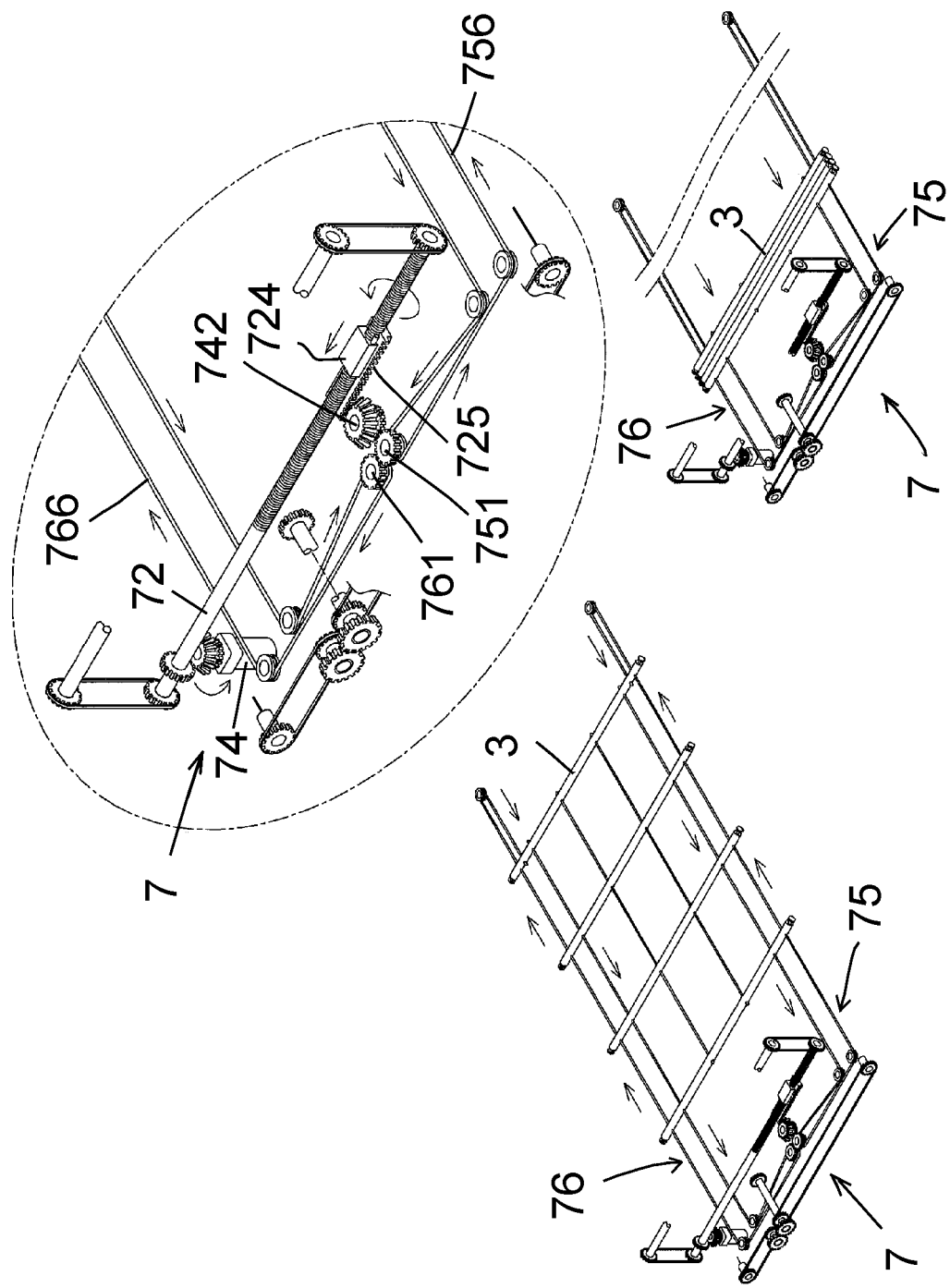
FIG. 5 shows that the transverse bars are collected and released.

As shown in FIGS. 4 and 5, the bed board unit 4 is supported on the transverse bars 3. The transverse bars 3 have to be collected before pivoting the bed board unit 4. The transmission device 7 includes a second bevel gear 742 indirectly driven by the gear reduction motor 74, a first pulley unit 75 and a second pulley unit 76 which is located symmetrically relative to the first pulley unit 75. The first pulley unit 75 includes a first gear 751, a first pulley 752 co-axially connected to the first gear 751, a first inside pulley 753, a first outside pulley 754 and a first stationary pulley 755. The second pulley unit 76 includes a second gear 761, a second pulley 762 co-axially connected to the second gear 761, a second inside pulley 763, a second outside pulley 764 and a second stationary pulley 765. A first cable 756 has the first end thereof connected to the first one of the transverse bars 3 connected between the two sides of the frame 13. The second end of the first cable 756 then goes around the first stationary pulley 755 and passes through the first one of the transverse bars 3 and the rest of the transverse bars 3, and the second end of the first cable 756 goes around the first outside pulley 754, the first pulley 752, the first inside pulley 753 and is fixed to the first one of transverse bars 3. Similarly, a second cable 766 has the first end thereof connected to the first one of the transverse bars 3 connected between the two sides of the frame 13. The second end of the second cable 766 goes around the second stationary pulley 765 and passes through the first one transverse bar 3 and the rest of the transverse bars 3, and the second end of the second cable 766 then goes around the second outside pulley 764, the second pulley 762, the second inside pulley 763 and is fixed to the first one transverse bar 3. Therefore, the gear reduction motor 74 drives the slide 724 toward the left side of the drawing. When the rack 725 moves to the second bevel gear 742, the first gear 751 is rotated and drives the first pulley 752, and the second gear 761 is engaged with the first pulley unit 75. The first pulley unit 75 is then engaged with the second pulley unit 76 so that the multiple transverse bars 3 are simultaneously collected or released.

When the bottom link 72 is driven by the gear reduction motor 74 and drives the slide 724 toward the right in the drawing, the rack 725 drives the second bevel gear 742 to rotate clockwise, and the first gear 751 and the first pulley 752 are rotated counter clockwise. The first pulley unit 75 and the second pulley unit 76 simultaneously pull the first and second cables 756, 766 at inner position to move the first one transverse bar 3 toward the rest of the transverse bars 3 until all of the transverse bars 3 are collected together. On the contrary, when the bottom link 72 is driven by the gear reduction motor 74 and drives the slide 724 counter clockwise, the first pulley unit 75 and the second pulley unit 76 simultaneously pull the first and second cables 756, 766 at outer position so that all of the transverse bars 3 are released to the initial positions.

Figure 6:
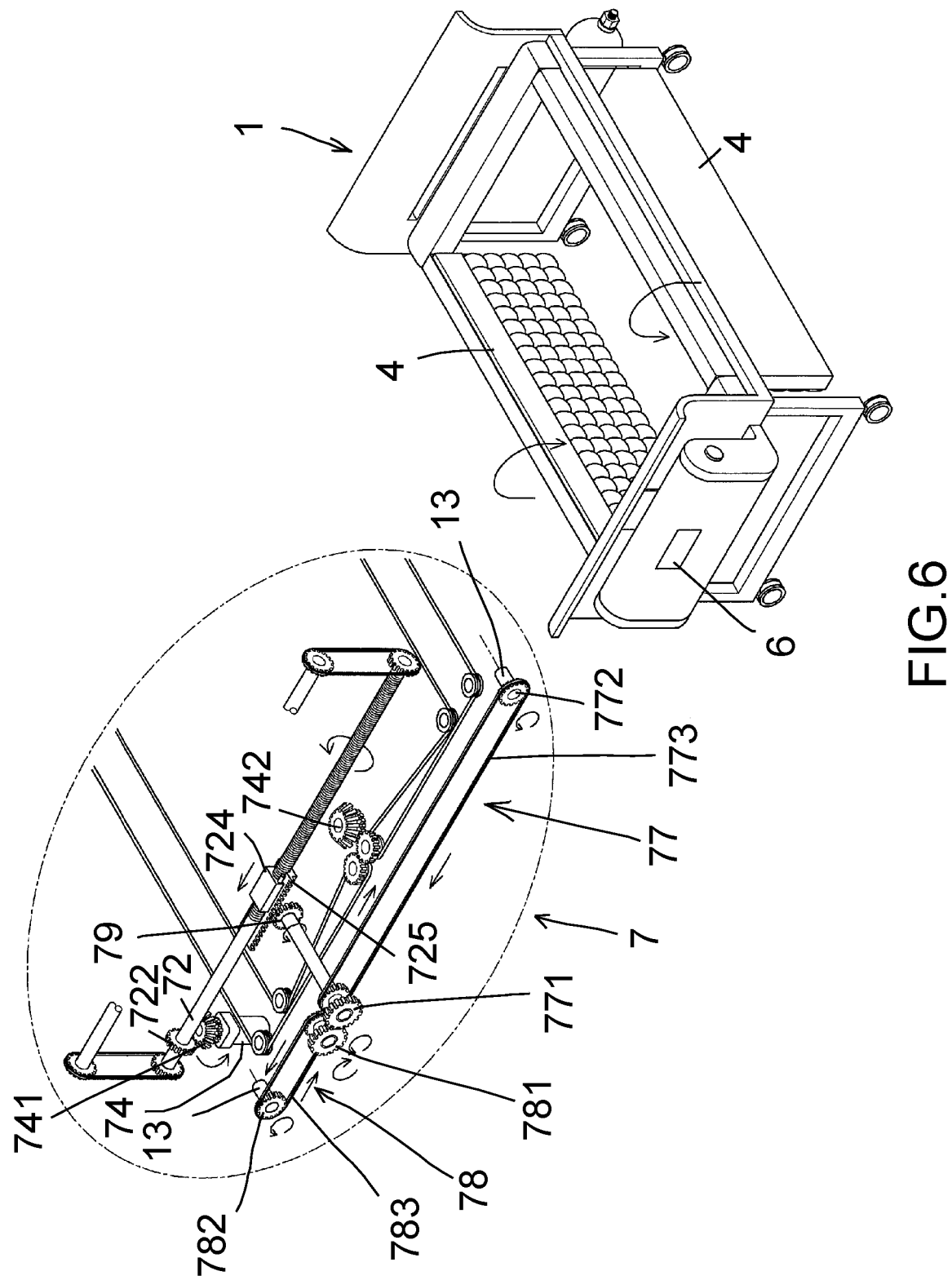
FIG. 6 shows that the bed board unit is opened.

As shown in FIG. 6, after the transverse bars 3 return to their initial positions, the bed board unit 4 can be opened. The transmission device 7 includes a first transmission unit 77, a second transmission unit 78 and a driven gear 79. The first transmission unit 77 includes a first co-axial gear 771, a first end gear 772 and a first chain 773. The second transmission unit 78 includes a second co-axial gear 781, a second end gear 782 and a second chain 783. The driven gear 79 is co-axially connected to the second co-axial gear 781 which is engaged with the first co-axial gear 771. The first and second end gears 772, 782 are respectively connected to the two sides of the frame 13 so as to control the bed board unit 4 to open or to close.

When the bed board unit 4 is to be opened, the gear reduction motor 74 drives the first bevel gear 741 counter clockwise, the passive gear 722 drives the bottom link 72 so that the slide 724 moves toward the left of the drawing. When the rack 725 of the slide 724 is engaged with the driven gear 79, the second co-axial gear 781 drives the first co-axial gear 771. The first and second chains 773, 783 respectively drive the first end gear 772 and the second end gear 782, such that the two bed boards of the bed board unit 4 are pivoted downward 90 degrees and stop at the downward positions. On the contrary, when the bed board unit 4 is to be closed, the gear reduction motor 74 drives the first bevel gear 741 clockwise, the slide 724 returns, and the rack 725 of the slide 724 is disengaged from the driven gear 79. The second co-axial gear 781 drives the first co-axial gear 771. The first and second chains 773, 783 respectively pull the first end gear 772 and the second end gear 782, such that the two bed boards of the bed board unit 4 are pivoted upward 90 degrees and stop at the horizontal positions.

As shown in FIG. 2 the inflatable tub 5 can be inflated to form a tub with a cushion button 51 which is enclosed by a sidewall 52. The inflatable tub 5 further includes an air inlet/outlet 53 and a water inlet/outlet 54. An air source 8 is provided and the air source 8 can be a pressurized air bottle or an air compressor. The air source 8 can be located beneath the head end 11 or the foot end 12 so as to provide pressurized air to inflate the inflatable tub 5.

The patient lies on the bead 1 and the water-proof pad 2 is controlled to be tightened to fully support the patient. The transverse bars 3 are then collected toward the foot end 12, and the two bed boards of the bed board unit 4 are pivoted downward 90 degrees. The inflatable tub 5 located beneath the bed 1 is then inflated by the air source 8 to form a bathing room in the inflatable tub 5, warm water is then introduced into the bathing room. The water-proof pad 2 is then controlled to be slowly loosened until the patient sits in the inflatable tub 5. After the patient is cleaned up, the water-proof pad 2 is controlled to be tightened again to remove the patient from the inflatable tub 5. The water is released and the pressurized air is released from the inflatable tub 5. The two bed boards of the bed board unit 4 are pivoted upward 90 degrees, and the transverse bars 3 are removed to their initial positions to support the bed board unit 4. A mattress or the like can be put between the water-proof pad 2 and bed board unit 4 as needed. The water-proof pad 2 is then controlled to be properly loosened until the patient's weight is support by the bed board unit 4.

Figure 7:
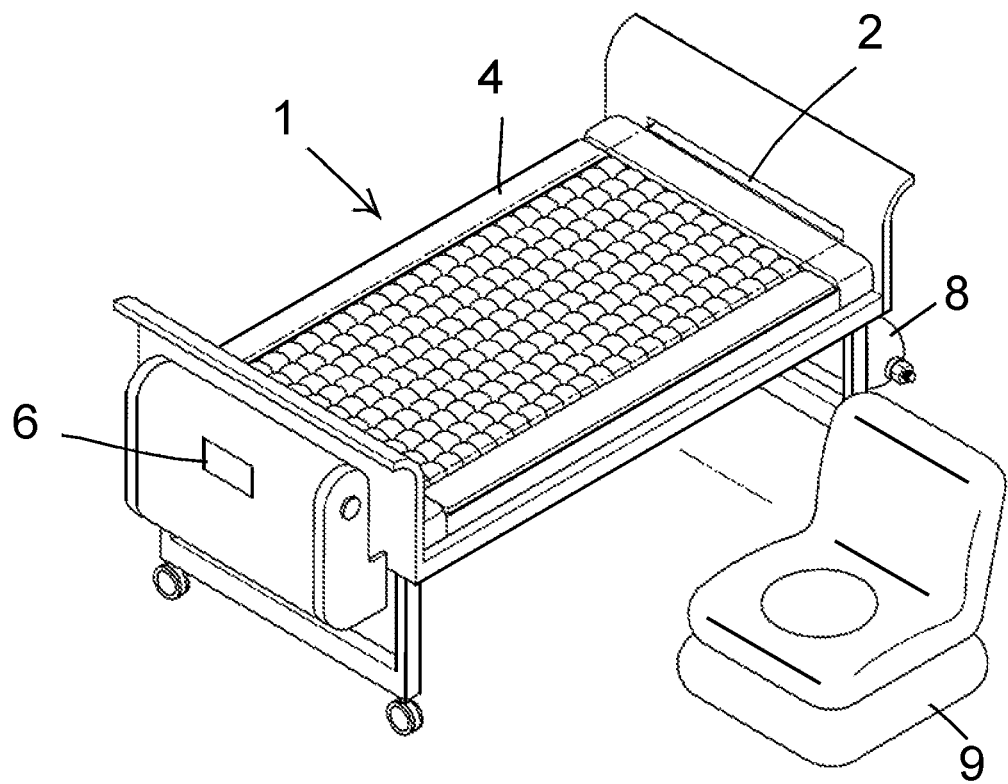
FIG. 7 shows the use of the bedpan while the bed board unit is opened.
Figure 7:
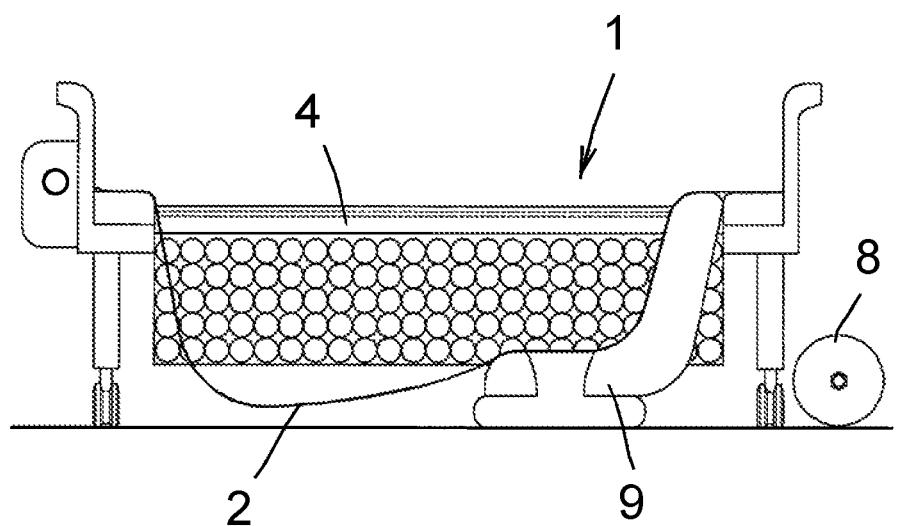

As shown in FIG. 7, the inflatable tub 5 can be replaced with a bedpan 9. Therefore, the patient can use the bedpan 9 in the same way as using the inflatable tub 5.

After the inflatable tub 5 and the bedpan 9 are used and cleaned, they are stored beneath the bed 1 without occupying too much space.

Figure 8:
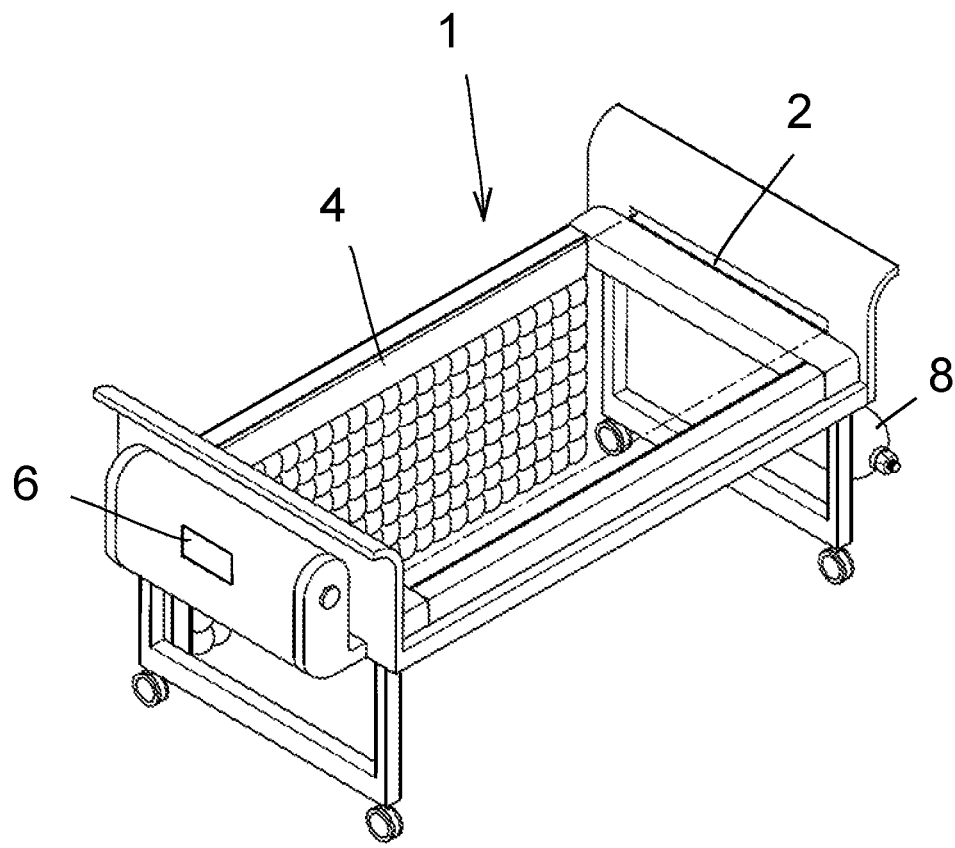
FIG. 8 shows that the bed board unit is pivotably connected to one side of the frame of the bed.

As shown in FIG. 8, the bed unit can be a single bed board and is pivotably connected to one of the two sides of the frame 13. Therefore, the bed board unit 4 is opened or closed from one side of the frame 13.

The sheet or mattress between the water-proof pad 2 and the bed board unit 4 of the bed 1 of the present invention can be easily replaced when the water-proof pad 2 is tightened to keep the patient not contacting the bed board unit 4.

The present invention allows the assistants or families to take care the patient while the patient does not need to be removed from the bed 1. The present invention reduces the risk of accidents to the patient when removing the patient from the bed.

While we have shown and described the embodiment in accordance with the present invention, it should be clear to those skilled in the art that further embodiments may be made without departing from the scope of the present invention.

What is claimed is:

1. A bed assembly comprising:
    a bed (1) having a head end (11), a foot end (12) and a frame (13) which is connected between the head end (11) and the foot end (12);
    a water-proof pad (2) located between the head end (11) and the foot end (12), the water-proof pad (2) being tightened, loosened and movable up and down,
    a bed board unit (4) pivotably connected to two sides of the frame (13), multiple inflatable balls being located on the bed board unit (4), and
    an operational panel (6) connected to the foot end (12) and controlling a transmission device (7) in the foot end (12),
    wherein the transmission device (7) includes a top link (71), a bottom link (72) and a gear reduction motor (74), the water-proof pad (2) is wrapped to the top link (71), the top link (71) includes a top gear (711) connected to each of two ends thereof, the bottom link (72) includes a bottom gear (721) connected to each of two ends thereof, a chain (73) connected to the top gear (711) and the bottom gear (721) of each of the two ends of the top link (71) and the bottom link (72), each of the top gears (711) includes an electro-magnetic valve key (712), a passive gear (722) is co-axially connected to the bottom link (72), the bottom link (72) includes a threaded section (723) and a slide (724), the slide (724) has a rack (725) which is threadedly engage with the threaded section (723) so that the slide (724) is movable along the threaded section (723), the slide (724) has a pin (726) extending therefrom to restrict rotation of the bottom gear (721), the gear reduction motor (74) directly drives a first bevel gear (741), the first bevel gear (741) is engaged with the passive gear (722) to control rotation of the bottom link (72) which then rotates the top link (71) via the chains (73).

2. The bed assembly as claimed in claim 1, wherein the frame (13) includes multiple transverse bars (3) evenly connected between the two sides thereof.

3. The bed assembly as claimed in claim 1, wherein the transmission device (7) includes a second bevel gear indirectly driven by the gear reduction motor, a first pulley unit (75) and a second pulley unit (76), the first pulley unit (75) includes a first gear (751), a first pulley (752) co-axially connected to the first gear (751), a first inside pulley (753), a first outside pulley (754) and a first stationary pulley (755), the second pulley unit (76) includes a second gear (761), a second pulley (762) co-axially connected to the second gear (761), a second inside pulley (763), a second outside pulley (764) and a second stationary pulley (765), a first cable (756) has a first end connected to at least one transverse bar (3) connected between the two sides of the frame (13), a second end of the first cable (756) goes around the first stationary pulley (755) and passes through the at least one transverse bar (3), the second end of the first cable (756) goes around the first outside pulley (754), the first pulley (752), the first inside pulley (753) and is fixed to the at last one transverse bar (3), a second cable (766) has a first end connected to the at least one transverse bar (3) connected between the two sides of the frame (13), a second end of the second cable (766) goes around the second stationary pulley (765) and passes through the at least one transverse bar (3), the second end of the second cable (766) goes around the second outside pulley (764), the second pulley (762), the second inside pulley (763) and is fixed to the at last one transverse bar (3).

4. The bed assembly as claimed in claim 1, wherein the transmission device (7) includes a first transmission unit (77), a second transmission unit (78) and a driven gear (79), the first transmission unit (77) includes a first co-axial gear (771), a first end gear (772) and a first chain (773), the second transmission unit (78) includes a second co-axial gear (781), a second end gear (782) and a second chain (783), the driven gear (79) is co-axially connected to the first co-axial gear (771) which is engaged with the second co-axial gear (781), the first and second end gears (772), (782) are respectively connected to the two sides of the frame (13).

5. The bed assembly as claimed in claim 1 further comprising an air source (8) which is a pressurized air bottle or an air compressor.

6. The bed assembly as claimed in claim 1 further comprising an inflatable tub (5) located beneath the bed (1), the inflatable tub (5) being inflated to form a tub with a cushioned bottom (51) which is enclosed by a sidewall (52).

7. The bed assembly as claimed in claim 6, wherein the inflatable tub (5) is replaced with a bedpan (9).

8. The bed assembly as claimed in claim 1, wherein the bed unit (4) is pivotably connected to one of the two sides of the frame (13).

* * * * *